United States Patent [19]

Nelson et al.

[11] Patent Number: 5,381,436
[45] Date of Patent: Jan. 10, 1995

[54] RING LASER GYRO EMPLOYING RADIO FREQUENCY FOR PUMPING OF GAIN MEDIUM

[75] Inventors: Joel D. Nelson; Rodney H. Thorland, both of Shoreview, Minn.

[73] Assignee: Honeywell, Inc., Minneapolis, Minn.

[21] Appl. No.: 69,232

[22] Filed: May 28, 1993

[51] Int. Cl.⁶ .............................................. H01S 3/083
[52] U.S. Cl. .................................. 372/94; 372/37
[58] Field of Search ........................... 372/94, 37

[56] References Cited

U.S. PATENT DOCUMENTS

| | | | |
|---|---|---|---|
| 3,649,931 | 3/1972 | Macek | 372/94 |
| 4,373,202 | 2/1983 | Laakmann et al. | |
| 4,386,853 | 6/1983 | Ljung | 372/94 |
| 4,493,087 | 1/1985 | Laakmann et al. | |
| 4,651,325 | 3/1987 | Wang et al. | |
| 4,686,681 | 8/1987 | Paranto et al. | |
| 4,694,458 | 9/1987 | Thierry | |
| 4,787,090 | 11/1988 | Newman et al. | |
| 4,821,281 | 4/1989 | Lind et al. | 372/94 |
| 4,945,543 | 7/1990 | Sharp | |
| 4,973,161 | 11/1990 | Simms | |
| 5,029,173 | 7/1991 | Seguin | |
| 5,040,184 | 8/1991 | Murray | |
| 5,048,032 | 9/1991 | Ekstrand et al. | |
| 5,065,405 | 11/1991 | Laakmann et al. | |
| 5,123,028 | 6/1992 | Hobart et al. | |
| 5,140,606 | 8/1992 | Yarborough et al. | |
| 5,157,462 | 10/1992 | Hahn | 372/94 |
| 5,196,905 | 3/1993 | Hahn et al. | 372/94 |

FOREIGN PATENT DOCUMENTS 0320102 10/1988 European Pat. Off. .
0436276 8/1990 European Pat. Off. .

*Primary Examiner*—Rodney B. Bovernick
*Assistant Examiner*—Robert E. Wise
*Attorney, Agent, or Firm*—Robert B. Leonard

[57] ABSTRACT

A ring laser gyro comprising a ring laser gyro block having a gain bore filled with a gain medium and apparatus for transmitting RF energy embedded within the ring laser gyro block proximate to the gain bore. The RF energy apparatus may be located so as to encompass the gain bore. Apparatus for providing RF energy is connected to the RF energy transmitting apparatus.

12 Claims, 5 Drawing Sheets

RING LASER GYRO EMPLOYING RADIO FREQUENCY FOR PUMPING OF GAIN MEDIUM

BACKGROUND OF THE INVENTION

1. Field of the Invention

The present invention is directed to the field of ring laser gyros, and, in particular, to a ring laser gyro employing an embedded radio frequency pumping apparatus.

2. Discussion of the Prior Art

Presently ring laser gyros (RLGs) utilize a D.C. discharge in order to start and maintain laser beams within a discharge cavity. In such use, D.C. electrodes must be in direct contact with the gain medium of the laser. In order to prevent leakage of external materials around these D.C. electrodes, an interfacial seal is used to bond the electrodes to the laser block. The integrity of such interfacial seals has historically limited the temperature range, reliability, and lifetime of RLGs employing the seals.

Often the gain necessary to sustain the laser beams in an RLG require discharge currents which are powerful enough to sputter cathode material into the gain medium. This sputtering contaminates the gain medium which results in shortening the laser lifetime and hence gyro reliability and performance. Additionally, the cathode or cathodes, depending upon the RLG configuration, pump gases from the gain medium producing undesirable gas mix changes.

European Patent Publication No. EP 0320 102 A1, having a filing date of Oct. 25, 1988, disclosed by John Albert Geen and entitled "Ring Laser Gyroscopes", discloses a ring laser gyroscope which employs a capacitively coupled RF energy through discharge to maintain the gyro. The gyroscope as disclosed by Geen is a block of Zerodur or the like generally having the shape of a cube. Electrodes transmitting the RF energy are deposited onto the outer surface of the cube.

In contrast to the prior art as disclosed by Geen, the present invention employs an inductive coil wrapped around one leg of the bore and a ring laser gyro and which is embedded in the gyro block itself. An alternate embodiment of the present invention provides a capacitively coupled RF apparatus wherein one leg of the gain bore is juxtaposed between the plates which are embedded in the gyro block itself.

In contrast to the prior art, the apparatus provided by the present invention couples radio frequency (RF) energy into the gain medium of a ring laser gyro using embedded components. The present invention thereby provides an apparatus for eliminating the need for the electrodes and their associated seals. Thus, alleviating inherent lifetime and reliability limitations found in the prior art.

SUMMARY OF THE INVENTION

In contrast to the prior art the present invention discloses a ring laser gyro comprising a ring laser gyro block having a gain bore filled with a gain medium and means for transmitting RF energy embedded within the ring laser gyro block proximate to the gain bore. The RF energy means may be located so as to encompass the gain bore. Means for providing RF energy is connected to the RF energy transmitting means.

In one example of the invention, the means for transmitting RF energy comprises a coil encompassing a portion of the gain bore.

In another aspect of the invention the means for transmitting RF energy comprises capacitive plates embedded within the RLG blocks such that a portion of the gain bore is juxtaposed between the plates.

In yet another aspect of the invention the RF transmitting means comprises a plurality of coils arranged within the ring laser gyro block wherein each coil is wound around a portion of the gain bore.

Beyond the advantages mentioned hereinabove this approach may use a simplified block assembly thus lowering the cost of the block assembly. Additionally, elimination of the electrode seals allows the block to be processed at higher temperatures than were previously possible. This promotes block cleanliness and may eliminate the need for a getter in the cavity. Another advantage of the present invention is that the voltage levels required to initiate and sustain lasing may be significantly lower, for example, by one to two orders of magnitude, thereby reducing high altitude/low pressure operating risks as well as a need to encapsulate/insulate exposed high voltage surfaces.

One embodiment of the present invention employs one or more electrode plates to capacitively couple RF energy into the gain medium. An alternative method of the invention employs one or more coils which inductively couple RF energy into the gain medium. Using several plates or coils advantageously allows for the utilization of several phases of an RF drive source which promotes a smoothing of the output and allows the use of lower frequencies than might otherwise be possible.

Other objects features and advantages of the invention will be apparent from the detailed description of the preferred embodiment, claims and figures herein wherein like numerals refer to like elements.

DETAILED DESCRIPTION OF THE PREFERRED EMBODIMENT

Figure 1:
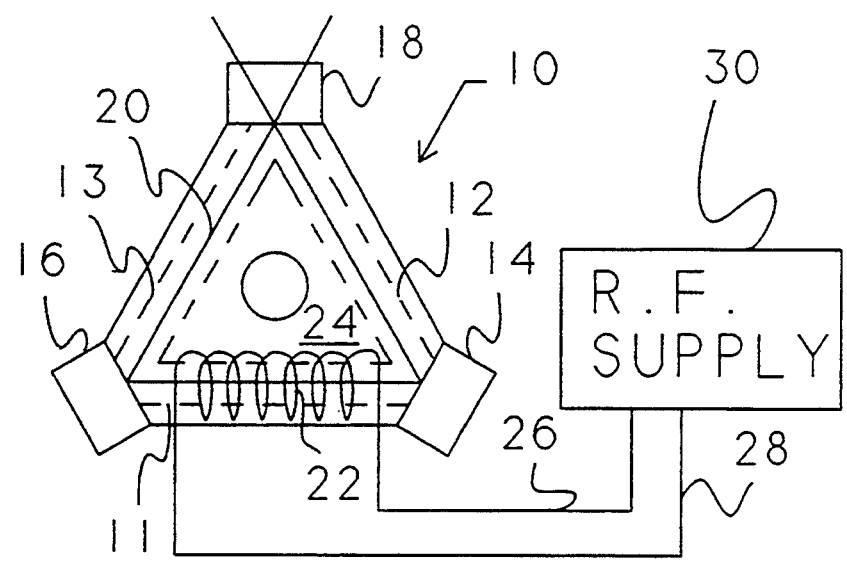
FIG. 1 schematically shows a top view of one embodiment of a ring laser gyro employing RF gain pumping in accordance with one embodiment of the present invention.

Referring now to FIG. 1, a top view of one embodiment of a ring laser gyro 10 employing RF gain pumping in accordance with one embodiment of the present invention is schematically shown. The RLG 10 comprises a gyro block 24, transducer mirrors 16, 14, readout mirror 18, discharge bores 11, 12 and 13, and inductive coil 22. Apart from the inductive coil 22, the RLG is manufactured in accordance with well-known techniques. The block may be made of Zerodur, silica or other comparable material having stable temperature expansion characteristics. The transducer mirrors 14, 16 and the readout mirror 18 are bonded to the corners of the block 24 to form a gas tight seal. A well known gain medium such as helium neon (HeNe) gas may be employed to fill the RLG discharge bores 11, 12 and 13. Upon discharge, counter propagating laser beams 20 are induced in the RLG.

Figure 2:
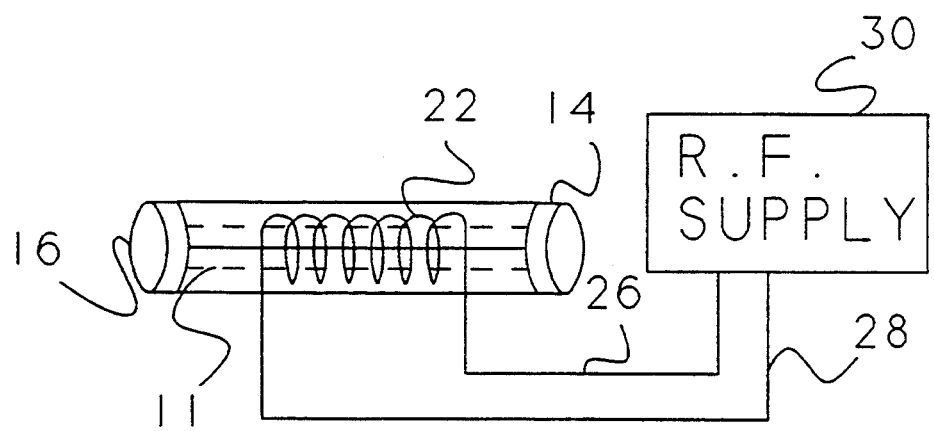
FIG. 2 schematically shows a side view of the ring laser gyro of FIG. 1.

FIG. 2 schematically shows a side view of the ring laser gyro of FIG. 1. The coil 22 is wound around RLG bore 11, for example, and is embedded within the RLG block 24. The coil 22 may be comprised of any suitable conductive material. The coil may be constructed in accordance with well known coil winding techniques. The coil may be embedded by depositing or printing onto the block, for example, or by drilling holes through the block. The first terminal of the inductance coil 22 is connected by a conductor 28 to an RF supply 30. A second leg of the inductance coil 26 is connected by connector 26 to another second terminal of RF supply. RF supply 30 may be constructed in accordance with well-known engineering techniques. The RF supply for discharging the coil may advantageously be about 100 MHZ.

Figure 3:
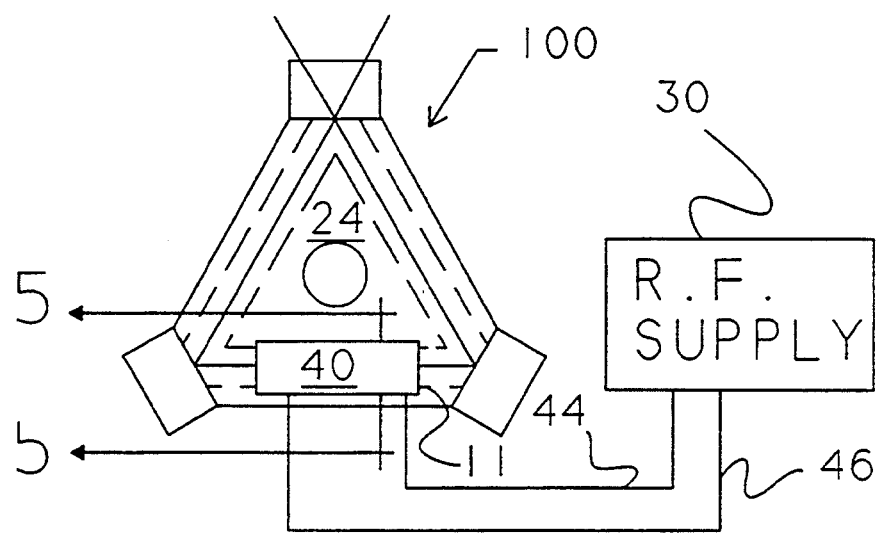
FIG. 3 schematically shows a top view of one embodiment of a ring laser gyro employing RF gain pumping in accordance with an alternate embodiment of the present invention.

Referring now to FIG. 3, an alternate embodiment of the RLG provided in accordance with the present invention is shown. The alternative RLG 100 may be constructed similarly to RLG 10 with the exception of substituting capacitive plates 40, 42 for the inductive coil 22.

Figure 4:
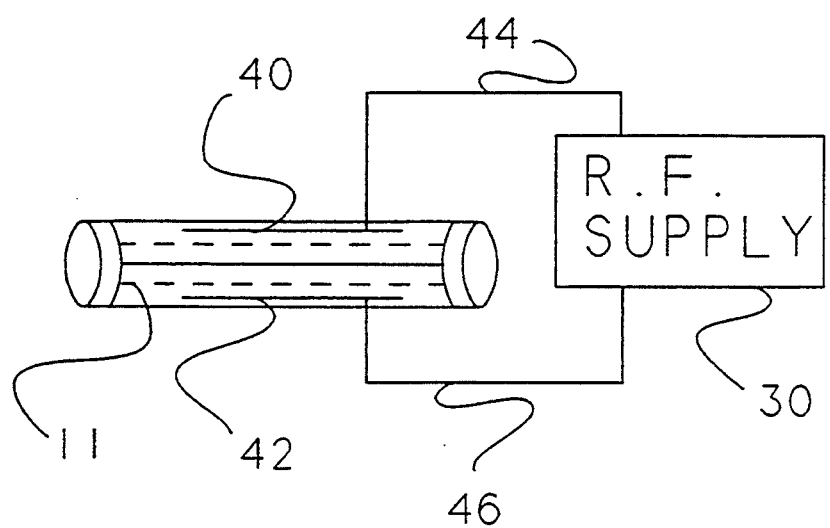
FIG. 4 schematically shows a side view of the ring laser gyro of FIG. 3.

FIG. 4 schematically shows a side view of the ring laser gyro of FIG. 3. One gain bore section 11 is juxtaposed between embedded capacitive plates 40 and 42. Capacitive plate 40 is coupled by conductor 44 to RF supply 30 at the first terminal. Capacitive plate 42 is coupled by conduit 46 to a second terminal of RF supply 30. Any suitable conductive material may be used to form the capacitive plates. For example, conductive adhesive strips may be used to form capacitive plates 40, 42 in one example embodiment of the invention.

Figure 5:
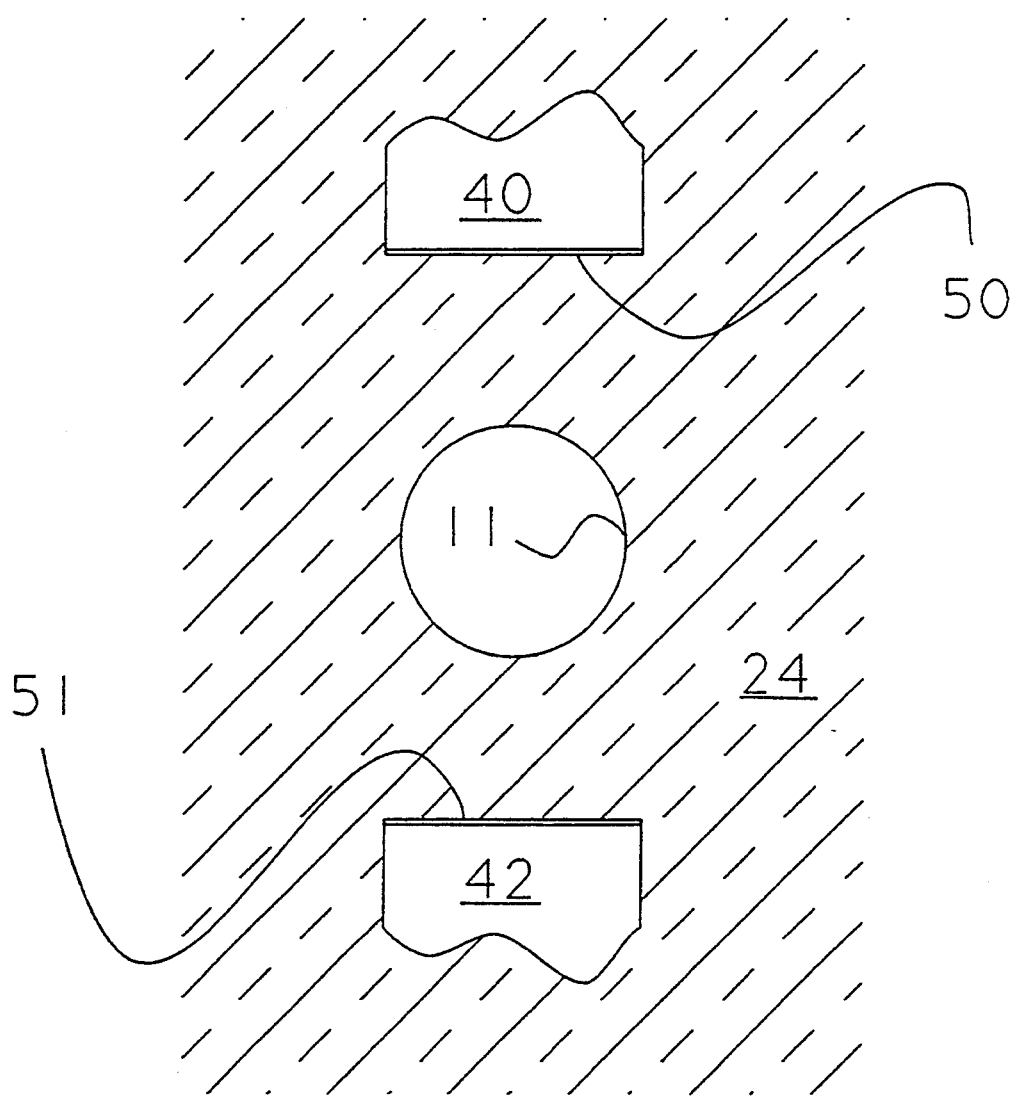
FIG. 5 schematically shows a more detailed cross sectional view of the ring laser gyro of FIG. 3.

Now referring to FIG. 5, a cross sectional view of a portion of the RLG is shown in FIG. 3 looking into bore 11. A description of one example of the invention follows immediately hereinbelow. It is understood that this example is by way of illustration only and the invention is not considered to be so limited. In one example of the invention, the distance between the surfaces 50, 51 of the capacitive plates 40, 42, respectively, and the outer surface of the gain bore is about 0.050 inches. The cross sectional area of the gain bore may be about $8.2E-6$ m$^2$. The gain bore length may be about 0.04 meters and the field intensity required for discharge is about 14.8E3 volts per meter. In this example, the RF frequency required is about 291 MHz. The required capacitance for each leg of the RLG lies in the range of about 0.99 pF to about 0.62 pF. The voltage required is about 48.8 $V_{RMS}$.

Figure 6:
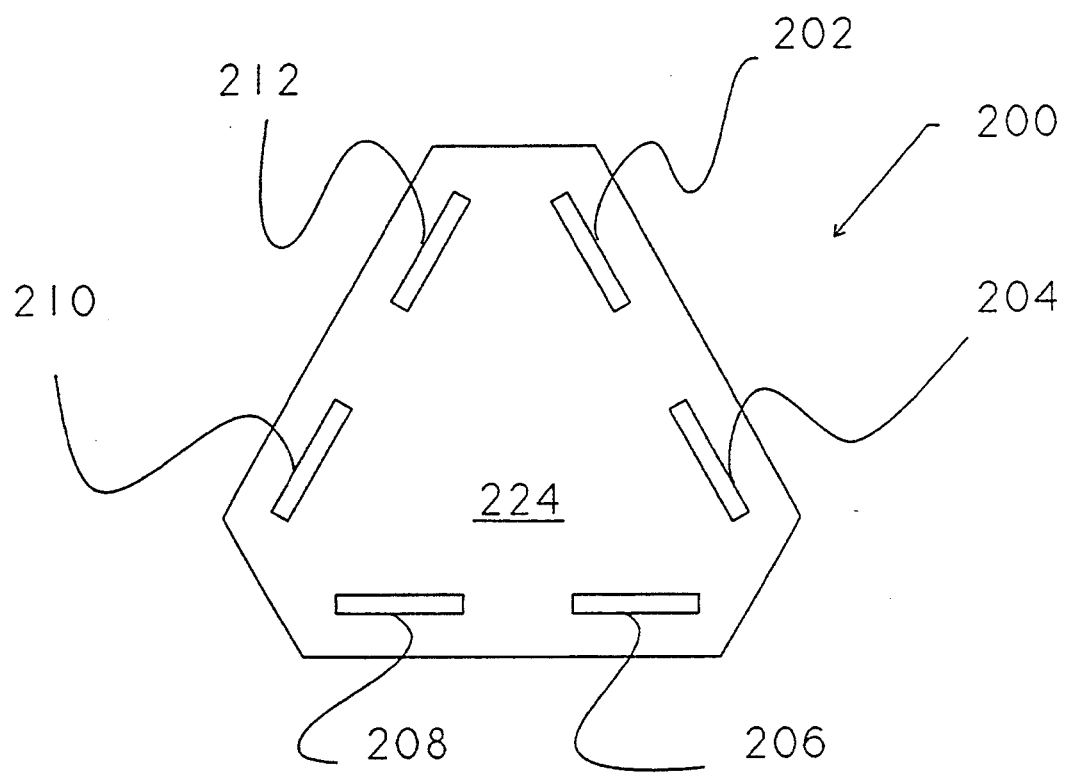
FIG. 6 schematically shows an alternative embodiment of the invention employing a plurality of pairs of capacitive plates.

Now referring to FIG. 6, another alternative embodiment of the invention is shown. RLG 200 comprises a block 224 and a plurality of pairs of capacitive plates. In the 1st through 6th, pairs of capacitive plates 202, 204, 206, 208, 210, and 212 are shown. Again, this is by way of illustration and not limitation. It will be understood that a greater or lesser number of such plates may be used in configurations employing the methods and apparatus of the present invention. The RLG subassembly 200 may be manufactured in accordance with the steps described hereinbelow.

The general block 224 may be advantageously selected from any standard general block such as a model GG1342 RLG block as manufactured by Honeywell, Inc. of Minneapolis, Minn. The block may be then milled appropriately to remove block material, such as Zerodur, to create channels for the capacitive plates. The capacitive plates themselves may then be bonded to the milled channels. The plates may be selected to have a plate width of about 0.125 inches, a length of about 0.050 inches and a thickness of about 50 Mils. Lengths may range from about 0.60 to 0.80 inches. The plates may advantageously be embedded in the block to be within about 0.050 inches of the RLG bores, which may advantageously be juxtaposed between the plates.

Figure 7:
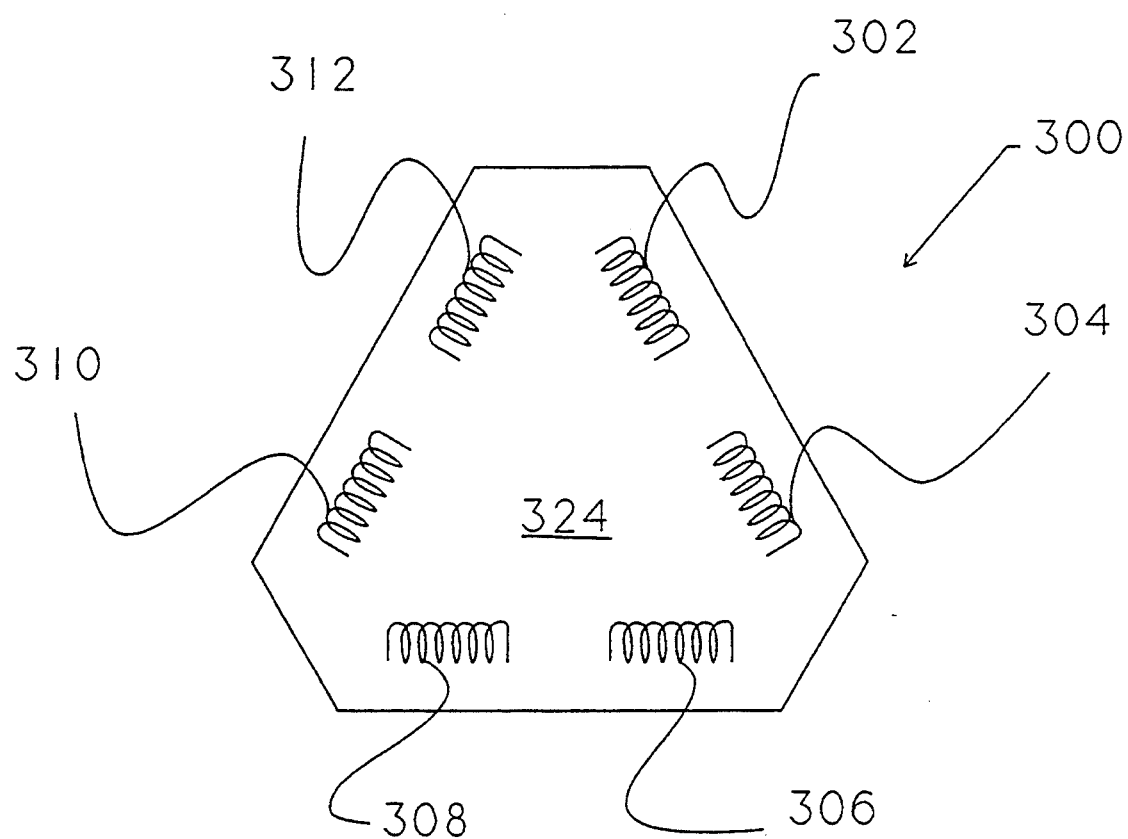
FIG. 7 schematically shows another alternative embodiment of an RLG subassembly wherein a plurality of conductance coils are employed.

Now referring to FIG. 7, another alternative embodiment of an RLG subassembly 300 is shown schematically wherein a plurality of conductance coils are employed in place of the capacitor of FIG. 6. One advantage to using multiple plates or coils for each leg of the RLG is that it allows for the utilization of several phases of the RF drive source. This promotes a smoothing of the output power and allows the use of lower frequencies than might otherwise be necessary.

Multiple phases may be employed with any of the embodiments of the invention using multiple RF transmitting means, that is, either coils or capacitor plates. For example, in an embodiment using two pairs of capacitive plates, the capacitive plate pairs may be driven with a phase difference of 90°. Other configurations may be similarly driven to maintain the desired smoothing effect.

The invention has been described herein in considerable detail in order to comply with the Patent Statutes and to provide those skilled in the art with the information needed to apply the novel principles and to construct and use such specialized components as are required. However, it is to be understood that the invention may be carried out by specifically different equipment and devices, and that various modifications, both as to the equipment details and operating procedures, may be accomplished without departing from the scope of the invention itself.

What is claimed is:

1. A ring laser gyro comprising:
   (a) a ring laser gyro block comprising a gain bore filled with a gain medium;
   (b) means for transmitting RF energy embedded within the ring laser gyro block in proximity to the gain bore and located so as to encompass the gain bore wherein the means for transmitting RF energy comprises capacitive plates embedded within the RLG block such that a portion of the gain bore is juxtaposed between the plates; and
   (c) means for providing RF energy connected to the RF energy transmitting means.

2. A ring laser gyro comprising:
   (a) a ring laser gyro block comprising a gain bore filled with a gain medium wherein the gain comprises a plurality of linear bores arrange at oblique angles in communication with each other;
   (b) a plurality of means for transmitting RF energy embedded within the ring laser gyro block, each one of said plurality of RF energy transmitting means being arranged to encompass one of the plurality of linear bores; and (c) means for providing RF energy connected to the plurality of RF energy transmitting means.

3. The ring laser gyro of claim 2 wherein the plurality of means for transmitting RF energy comprises a plurality of coils, each of the plurality of coils encompassing a portion of one of the plurality of linear bores.

4. The ring laser gyro of claim 3 wherein the means for providing RF energy comprises a plurality of phase shift means, so as to provide RF energy of different phases to each one of the plurality of the plurality of coils.

5. The ring laser gyro of claim 3 wherein the plurality of coils are arranged within the ring laser gyro block such that at least one of the plurality of linear bores is juxtaposed between at least two of the plurality of coils.

6. The ring laser gyro of claim 2 wherein each one of the plurality of means for transmitting RF energy comprises capacitive plates embedded within the RLG block such that a portion of one of the linear bores is juxtaposed between one or more of the capacitive plates.

7. The ring laser gyro apparatus of claim 6 wherein the plurality of capacitive plates are arranged within the ring laser gyro block such that at least one of the plurality of linear bores is juxtaposed between at least two of the pairs of capacitive plates.

8. The ring laser gyro of claim 6 wherein the ring laser gyro block comprises a plurality of opposing parallel channels structured to receive the plurality of capacitive plates.

9. The ring laser gyro of claim 8, wherein the means for providing RF energy comprises a plurality of phase shift means, so as to provide RF energy of different phases to each one of the plurality of capacitive plates.

10. A ring laser gyro comprising:

(a) a ring laser gyro block comprising a gain bore filled with a gain medium; and (b) means for transmitting RF energy embedded within the ring laser gyro block in proximity to the gain bore and located so as to encompass the gain bore wherein the means for transmitting RF energy comprises capacitive plates embedded within the RLG block such that a portion of the gain bore is juxtaposed between the capacitive plates, the RF energy transmitting means being adapted to be connected to all RF energy source.

11. The ring laser gyro of claim 10 wherein the ring laser gyro block comprises opposing parallel channels structured to receive the capacitive plates.

12. The ring laser gyro of claim 10 wherein the ring laser gyro block comprises opposing parallel channels structured to receive the capacitive plates.

* * * * *